US008644511B2

(12) United States Patent
Chen

(10) Patent No.: US 8,644,511 B2
(45) Date of Patent: Feb. 4, 2014

(54) SYSTEM AND METHOD FOR PROVIDING DIGITAL CONTENT

(75) Inventor: Michael A. Chen, Wallingford, PA (US)

(73) Assignee: Comcast Cable Communications, LLC., Philadelphia, PA (US)

(*) Notice: Subject to any disclaimer, the term of this patent is extended or adjusted under 35 U.S.C. 154(b) by 499 days.

(21) Appl. No.: 12/265,169

(22) Filed: Nov. 5, 2008

(65) Prior Publication Data

US 2010/0115572 A1 May 6, 2010

(51) Int. Cl.
*H04K 1/00* (2006.01)
*G06F 7/04* (2006.01)
*H04N 7/167* (2011.01)
*G08B 13/14* (2006.01)

(52) U.S. Cl.
USPC ............... 380/258; 726/9; 726/26; 725/31; 340/572.1

(58) Field of Classification Search
USPC ........... 726/2–10, 26–30; 713/150, 160–161, 713/164–165, 168, 176; 380/200–203, 210, 380/255, 259; 340/568.6, 572.1; 725/25, 725/29–31, 78, 83; 705/50–53, 14.1–14.12, 705/14.37–14.39
See application file for complete search history.

(56) References Cited

U.S. PATENT DOCUMENTS

| 5,779,839 | A | 7/1998 | Tuttle et al. |
| 5,972,152 | A | 10/1999 | Lake et al. |
| 5,983,363 | A | 11/1999 | Tuttle et al. |
| 6,045,652 | A | 4/2000 | Tuttle et al. |
| 6,078,791 | A | 6/2000 | Tuttle et al. |
| 6,097,301 | A | 8/2000 | Tuttle |
| 6,137,403 | A | 10/2000 | Desrochers et al. |
| 6,226,619 | B1 * | 5/2001 | Halperin et al. ............... 705/23 |
| 6,773,344 | B1 * | 8/2004 | Gabai et al. ..................... 463/1 |
| 7,031,946 | B1 * | 4/2006 | Tamai et al. .................... 705/67 |
| 7,230,534 | B2 | 6/2007 | Elledge |
| 7,840,006 | B2 | 11/2010 | Ogawa et al. |
| 7,978,720 | B2 | 7/2011 | Russ et al. |
| 8,151,342 | B2 | 4/2012 | Choi et al. |
| 2001/0051925 | A1 * | 12/2001 | kang ............................... 705/51 |
| 2001/0054014 | A1 * | 12/2001 | Noda et al. ...................... 705/26 |
| 2002/0077985 | A1 * | 6/2002 | Kobata et al. ................... 705/51 |
| 2002/0087867 | A1 * | 7/2002 | Oberle et al. ................. 713/183 |
| 2002/0093426 | A1 * | 7/2002 | Jackson et al. ............. 340/572.7 |

(Continued)

FOREIGN PATENT DOCUMENTS

| WO | 2004027538 A2 | 4/2004 |
| WO | 2005/081087 A1 | 9/2005 |
| WO | 2008023337 A2 | 2/2008 |

OTHER PUBLICATIONS

Office Action for CA 2,684,228—Mailing Date Aug. 7, 2012.

(Continued)

*Primary Examiner* — Darren B Schwartz
(74) *Attorney, Agent, or Firm* — Banner & Witcoff, Ltd.

(57) ABSTRACT

A method of providing access to content based upon one or more adequately-credentialed keys being proximate to a certain location. The method includes a first step of acquiring credential information from at least one key tagged with credential information using a credential acquisition device (CAD) at the certain location. The method also includes a second step of confirming that the credential information meets requirements for receiving the content. Further, the method includes a step of providing access to the content after performing the first and second steps.

23 Claims, 2 Drawing Sheets

(56) References Cited

U.S. PATENT DOCUMENTS

| | | | |
|---|---|---|---|
| 2002/0136407 A1* | 9/2002 | Denning et al. | 380/258 |
| 2003/0018582 A1* | 1/2003 | Yaacovi | 705/51 |
| 2003/0052794 A1 | 3/2003 | Barile et al. | |
| 2003/0084003 A1* | 5/2003 | Pinkas et al. | 705/71 |
| 2003/0097655 A1* | 5/2003 | Novak | 725/31 |
| 2004/0010687 A1* | 1/2004 | Futa et al. | 713/168 |
| 2004/0049468 A1* | 3/2004 | Walmsley | 705/76 |
| 2004/0092311 A1* | 5/2004 | Weston et al. | 463/42 |
| 2004/0111751 A1* | 6/2004 | Tsuria | 725/104 |
| 2004/0117843 A1* | 6/2004 | Karaoguz et al. | 725/108 |
| 2004/0205028 A1* | 10/2004 | Verosub et al. | 705/59 |
| 2004/0215963 A1* | 10/2004 | Kaplan | 713/172 |
| 2004/0230488 A1* | 11/2004 | Beenau et al. | 705/18 |
| 2005/0076092 A1* | 4/2005 | Chang et al. | 709/217 |
| 2005/0105734 A1* | 5/2005 | Buer et al. | 380/270 |
| 2005/0114270 A1* | 5/2005 | Hind et al. | 705/64 |
| 2005/0192902 A1* | 9/2005 | Williams | 705/51 |
| 2005/0234768 A1* | 10/2005 | Wald et al. | 705/14 |
| 2005/0289061 A1* | 12/2005 | Kulakowski et al. | 705/50 |
| 2006/0069926 A1* | 3/2006 | Ginter et al. | 713/194 |
| 2006/0094504 A1* | 5/2006 | Polchin | 463/36 |
| 2006/0132311 A1* | 6/2006 | Kruest et al. | 340/572.4 |
| 2006/0150180 A1* | 7/2006 | Schmidt et al. | 717/173 |
| 2006/0179006 A1* | 8/2006 | Humpleman et al. | 705/64 |
| 2006/0247984 A1* | 11/2006 | Shaw | 705/28 |
| 2006/0259927 A1* | 11/2006 | Acharya et al. | 725/61 |
| 2006/0271437 A1* | 11/2006 | Maggio | 705/14 |
| 2007/0027812 A1* | 2/2007 | Ogawa et al. | 705/57 |
| 2007/0046439 A1* | 3/2007 | Takaku et al. | 340/10.41 |
| 2007/0108292 A1* | 5/2007 | Montague | 235/487 |
| 2007/0182555 A1* | 8/2007 | Walker et al. | 340/572.1 |
| 2007/0250573 A1* | 10/2007 | Rothschild | 709/205 |
| 2007/0276925 A1* | 11/2007 | La Joie et al. | 709/219 |
| 2007/0282691 A1* | 12/2007 | Rosenberg | 705/26 |
| 2008/0002951 A1* | 1/2008 | Russ et al. | 386/124 |
| 2008/0092181 A1* | 4/2008 | Britt | 725/87 |
| 2008/0103890 A1* | 5/2008 | Lulic et al. | 705/14 |
| 2008/0148363 A1* | 6/2008 | Gilder et al. | 726/4 |
| 2008/0197969 A1* | 8/2008 | Vogt et al. | 340/5.8 |
| 2008/0235108 A1* | 9/2008 | Kulakowski et al. | 705/26 |
| 2008/0243694 A1* | 10/2008 | Johnson et al. | 705/52 |
| 2008/0275761 A1* | 11/2008 | Seifer et al. | 705/10 |
| 2008/0301761 A1* | 12/2008 | Malcolm | 726/1 |
| 2008/0320558 A1* | 12/2008 | Imanishi et al. | 726/2 |
| 2009/0023406 A1* | 1/2009 | Ellis et al. | 455/140 |
| 2009/0070213 A1* | 3/2009 | Miller et al. | 705/14 |
| 2009/0070884 A1* | 3/2009 | Wu et al. | 726/27 |
| 2009/0077652 A1* | 3/2009 | Choi et al. | 726/16 |
| 2009/0085724 A1* | 4/2009 | Naressi et al. | 340/10.6 |
| 2009/0158439 A1* | 6/2009 | Lee et al. | 726/26 |
| 2009/0325483 A1* | 12/2009 | May | 455/41.1 |
| 2010/0043060 A1* | 2/2010 | Reuzel et al. | 726/4 |
| 2010/0083322 A1* | 4/2010 | Rouse | 725/93 |
| 2011/0060658 A1* | 3/2011 | Zellner | 705/26.25 |

OTHER PUBLICATIONS

Extended European Search Report EP 09174684—Mailign Date: Dec. 5, 2012.

* cited by examiner

SYSTEM AND METHOD FOR PROVIDING DIGITAL CONTENT

FIELD OF INVENTION

The present invention relates generally to delivering digital content to a user, and, more specifically, to delivering content to a user after the user has collected one or more objects to provide the user with the proper credentials to receive the content.

BACKGROUND OF INVENTION

With the advent of sophisticated telecommunications, much of today's entertainment is derived from video content transmitted to users via television and the Internet. As used herein, "digital content" or just "content" refers broadly to the information contained in a transmitted signal that provides value to an end-user/audience, and includes, for example, entertainment, news, and commercials in the form of, for example, video, audio, Internet websites, and interactive games, just to name a few.

The delivery of content is typically controlled by operators of information networks (e.g., cable, fiber optic service, hybrid fiber-coaxial (HFC), and satellite networks), or by content providers (e.g., website hosts, television networks, and some cable system and multiple system operators (MSOs)). Such operators or content providers often limit distribution of content to only those users having proper credentials to receive such content. As used herein in the telecommunication context, the term "credentials" or "credential information" refers to information associated with the user that verifies that the user is entitled or allowed to receive or gain access to the content. Although an increasing number of information networks use credentials, such as fingerprints, voice recognition, retinal scans, x.509 Public Key Certificate, and so on, in the delivery of content, the classic combination of a user account number or name and possibly a password is typical.

A common approach for verifying the credentials of a user is to have the credentials encoded into or otherwise associated with a specific piece of hardware, such as a set top box (STB). As used herein, a "set top box" or "STB" is a device that connects to a monitor and an external source of signal, and converts the signal into content for display on the monitor. The signal source might be an Ethernet cable, a satellite dish, a coaxial cable (cable television), optical fiber, a telephone line (including DSL connections), Broadband over Power Line, or even an ordinary VHF or UHF antenna. The STB is typically configured to transmit an identification, which a server recognizes as belonging to a user having a certain subscription plan that defines the scope of services and content the user is entitled to receive. The user identification and subscription plan therefore provide the credentials for delivering content to a user.

Despite the ubiquity of this approach, Applicants have identified shortcomings of having credentials embedded in a specific device, such as a STB. For example, limiting credentialing to a specific device ignores the vast number of networks separate from the specific device. Such networks can be found, for example, in Wi-Fi enabled coffee shops, sports venues, public bars and restaurants. These venues provide potentially interesting opportunities for downloading content to users. The delivery of such content, however, is limited because users are often unable to provide their credentials, however, because their credentials are embedded in a particular set top box, at home.

Although such venues may allow credentials to be provided by keying in a password or by entering credit card information, this requires the user to be proactive, which may be enough of a nuisance to dissuade the user for using the network. Additionally, passwords and credit card information can be lost or stolen, thereby allowing others, who actually do not have legitimate credentials, to fraudulently gain access to certain content by using misappropriated passwords or credit cards.

Therefore, a need exists to exploit the availability of content in locations where user-specific hardware is unavailable or cannot be used practically. To this end, a credentialing approach is required that is not constrained by location, hardware, and password limitations. The present invention fulfills this need among others.

SUMMARY OF INVENTION

The present invention represents a paradigm shift in how content is provided. Rather than having credentialing limited to a subscription plan that is specific to certain hardware or the input of a user password, the present invention uses objects or "keys" tagged with credential information to provide access to content when the keys are proximate to a credential-acquisition device (CAD). In other words, content is provided based not on a subscription, but on possession of a key.

The key "unlocks" the authorization controls on specified content allowing the user to receive the content while the key is proximate to the CAD. By having CADs located where content delivery is possible, for example, in or near STBs, WiFi networks, WWANs, and LANs, content becomes available in these locations if the key is present.

Therefore, the present invention connects locations and content through a key. This provides for a number of benefits. For example, the subject matter of the content may be related to the key for promotional purposes. In other words, the ability to receive content may be used as an incentive for a user to purchase or otherwise obtain a key. Specific examples include providing exclusive content on a sports team if the user purchases a team jersey or similar merchandise. In this case, the merchandise is tagged with the credentials. Likewise, a ticket may be purchased that can provide access not only to the event, but also to content while the user is at the event. In this case, the admission ticket to the event is the key. The present invention may also be used to incentivize one or more users to collect a number of keys to gain access to desired content. A specific example of this may be using a bottle top as a key and requiring a number of bottle tops to be collected and presented to a CAD before access to the content is granted. Likewise, different levels of content can be provided based on the number of keys collected—i.e., more keys unlock more content.

Accordingly, one aspect of the invention is a method of providing access to certain content based on one or more keys tagged with credential information being in a certain location. In a preferred embodiment, the method comprises: (a) acquiring credential information from at least one key tagged with credential information using a credential acquisition device (CAD) at the certain location; (b) confirming that the credential information meets requirements for receiving the content; and (c) providing access to the content after steps (a) and (b). Another aspect of the invention is a system for providing access to content based on one or more keys tagged with credential information being proximate to a certain location. In one embodiment, the system comprises: (a) a credential-acquisition device (CAD) in the certain location configured for receiving credential information from keys tagged with the credential information; (b) a server operatively connected to the CAD and configured to receive the credential information to determine if the credential information meets requirements for making content available for a user at the location; and (c) a content server interface configured for interfacing with a content server to provide the user with access to the content if the key is determined to have adequate credential information.

Yet another aspect of the invention is the key for providing the credential information to a network operator or content provider. In one embodiment, the key comprises an item and a tag associated with the item, the tag having credential information and being configured to communicate with a credential-acquisition device (CAD) to provide the CAD with the credential information.

DETAILED DESCRIPTION

Figure 1:
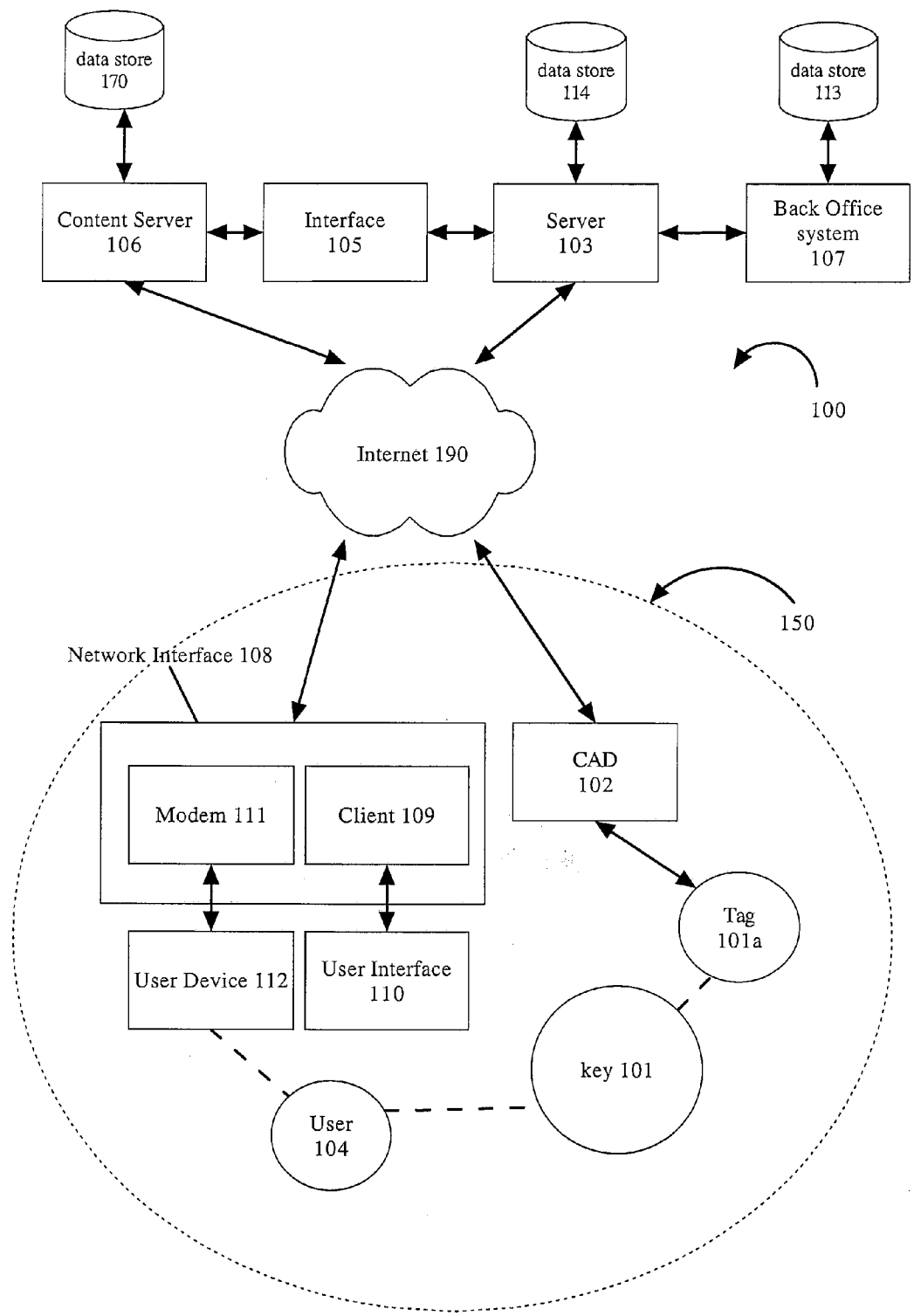
FIG. 1 is a schematic of one embodiment of the system of the present invention.

Referring to FIG. 1, an embodiment of the system 100 of the present invention is shown. System 100 functions to provide access to content based upon one or more adequately-credentialed keys 101 being proximate to a certain location 150. The system comprises at least one credential-acquisition device (CAD) 102 in the certain location 150 for receiving credential information transmitted from keys 101. The system 100 also comprises a server 103 operatively connected to the CAD 102 and configured to receive credential information to determine if the credential information meets requirements for making the content available to a user 104 at the location. The system also comprises a content server interface 105 configured for interfacing with a content server 106 to provide the user with access to the content after the credential information is determined to meet the requirements.

The elements above are discussed in greater detail below. It should be understood, however, that the schematic of FIG. 1 is provided for illustrative purposes only, and the system and process of the present invention may be practiced in ways not specifically shown in FIG. 1. For example, the servers, CADs and data stores disclosed may be further distributed among multiple servers, CADs and storage devices, or they may be consolidated in fewer servers, CADs and storage devices. For example, the server 103 and content server 106 may be integrated or multiple CADs may be employed the location 150. Additionally, it should be understood that the various components shown in FIG. 1 are not necessarily housed in a common area or even operated by a common entity. That is, the various servers and data stores may be operated by different companies and networked together. For example, the server 103 may be maintained by one party and the back office system 107 operated by another party. Therefore, the schematic of system 100 should not be used to limit the structure of the system more narrowly than the claims.

The key 101 may be any mobile, tangible item that comprises a tag 101a for storing credential information and for providing the credential information to CAD 102. In other words, once an item is tagged with credential information, it becomes a key. Credential information may include, for example, an identification of the key, a time stamp, information with respect to who purchased the key or other information that can be used to determine user identity and possibly a user's preferences/profile, and entitlements.

The selection of the item for tagging depends upon the application. As mentioned above, one of the principal purposes of the present invention is to promote the sale of the item by offering exclusive content. Accordingly, in one embodiment, some relationship between the tagged item and the content is generally preferred such that a user is inclined to purchase the item to obtain the content.

One approach is to have the item be merchandise related to the subject matter of the content. For example, a sports team may promote the sale of clothing and other merchandise bearing the team logo by offering exclusive content on the team (e.g., highlights or personal interviews) for those that purchase the merchandise. Likewise, a television program may promote the sale of action figures and other merchandise related to the program by offering exclusive content about the show (e.g., behind the scenes action or alternative shows) for those that purchase the merchandise. In the examples above, the items (i.e., clothing and action figures) are tagged with credential information sufficient to gain access to the content once the credential information is transmitted to the server 103.

Another approach is to have the key be associated with a consumable item, which in turn is associated with content. For example, a beverage or food stuff seller may promote the sale of its products by offering desirable content that is unavailable to the public for those that purchase the product. Likewise, an event promoter, for example, a rock concert promoter or studio, may promote the sale of tickets by offering to ticket holders content related to the event (concert or movie), such as, for example, interviews with the band members or actors. Again, in this approach, the items—i.e., the beverage bottles/caps, box tops, "prizes" in the box, or tickets—are tagged with credential information sufficient to gain access to the content once the credential information is transmitted to the server 103.

Alternatively, the tagged item might be free and intended to influence user behavior such as attending certain events or visiting certain establishments. For example, the tagged item may be a free coupon for presentation to a CAD located at a restaurant or tavern. Presumably, while the user is at the restaurant or tavern, he or she will purchase food and beverages there. Thus, the tagged item may be used to influence the user's spending/consumption behavior.

The CAD 102 may be any system suitable for acquiring the credential information from the key 101, and includes both wireless and physical connection systems. Examples of physical connection systems include hardwired connections using known interfaces, such as RJ connections, USB ports, or any other known electrical interfaces. The key may even interface with the CAD 102 through a physical lock/key mechanism in which the key actuates a physical mechanism to identify the key and the credential information it contains.

Alternatively, the CAD 102 may communicate with the key 101 through a wireless interface. Suitable wireless interfaces include any known technologies for establishing communication between devices including, for example, radio frequency identification (RFID), bar coding, scanning (OCR), magnetic (disk or strip), chemical marking technology (e.g., based on excitation patterns under certain light (e.g., UV light)), Wi-Fi, Bluetooth, infrared, and even acoustic. It should be understood that the key may actively transmit or passively transmit credential information to the CAD.

Given the mobility requirements of the items, it is preferable that the tag be relatively small such that a user can readily carry or wear the key or such that it can be incorporated into other items. Accordingly, in one embodiment, RFID is employed due to its miniaturization potential. In this embodiment, CAD 102 is an RFID reader or interrogator and the key 101 has an RFID tag. By way of background, RFID is an automatic identification method, relying on storing and remotely retrieving data using devices called RFID tags or transponders. An RFID tag is an object that can be applied to or incorporated into an item, in this case, a key, for the purpose of identification and tracking using radio waves.

There are essentially three types of RFID tags—passive, active, or semi-passive (also known as battery-assisted). Passive tags require no internal power source (they are only active when a reader is nearby to power them), whereas semi-passive and active tags require a power source, usually a small battery. Most passive tags signal by "backscattering" the carrier wave from the reader. Specifically, these tags operate by having a minute electrical current induced in their antenna by the incoming radio frequency signal. This means that the antenna has to be designed both to collect power from the incoming signal and to transmit the outbound backscatter signal. Due to their simplicity in design, RFID tag antennas are also suitable for manufacture using a printing process.

RFID tags may have a chip for communicating information or they may be chipless. A chip-containing RFID tag typically contains two parts—an integrated circuit for storing and processing information, modulating and demodulating a (RF) signal, and other specialized functions, and an antenna for receiving and transmitting the signal. In contrast, a chipless RFID allows for discrete identification of tags without an integrated circuit, thereby allowing tags to be "printed" directly onto the items at relatively low cost. Accordingly, passive, chipless RFID tags are generally preferred from a simplicity standpoint.

The response of a passive RFID tag is not limited to just the tag identification number. A tag may contain non-volatile data, possibly a writable EEPROM for storing data. In the present invention, the tag identification and non-volatile data are the credential information.

Because onboard power is not required, passive tags can be quite small. For example, commercially available passive RFID tags exist that can be embedded in a sticker (see, for example, Hara, Yoshiko (Feb. 6, 2006). "Hitachi advances paper-thin RFID chip", EETimes). Furthermore, examples of suitable technologies are described in the following U.S. patents, which are hereby incorporated by reference:

U.S. Pat. No. 7,230,534 Method and system for identifying lost or stolen devices;
U.S. Pat. No. 6,137,403 Sash sensor and method of sensing a sash using an array of multiplexed elements;
U.S. Pat. No. 6,097,301 RF identification system with restricted range;
U.S. Pat. No. 6,078,791 Radio frequency identification transceiver and antenna;
U.S. Pat. No. 6,045,652 Method of manufacturing an enclosed transceiver;
U.S. Pat. No. 5,983,363 In-sheet transceiver testing;
U.S. Pat. No. 5,972,152 Methods of fixturing flexible circuit substrates and a processing carrier, processing a flexible circuit and processing a flexible circuit substrate relative to a processing carrier; and
U.S. Pat. No. 5,779,839 Method of manufacturing an enclosed transceiver.

In one embodiment, the keys must be within a certain location to communicate with the CAD 102. The reason behind this is that the promotion of the key and content is often related to the location—e.g., sports arena, public bar/restaurant, or point of sale. The CAD 102, in such an embodiment, should have an ability to limit the keys being identified to just those in the certain location. This is readily achievable using the RFID communication described above. More specifically, at this time, passive tags have practical read distances ranging from about 11 cm (4 in) with near-field (ISO 14443), up to approximately 10 meters (33 feet) with far-field (ISO 18000-6) and can reach up to 600 feet (183 meters) when combined with a phased array. The reading and writing depend on the chosen radio frequency and the antenna design/size. Accordingly, the keys, specifically, the RFID antennas, can be designed to establish the desired range around the CAD 102 to define the location 150.

The server 103 functions to interface with the CAD 102 in location 150, or with multiple CADs in location 150 or in different locations to obtain and verify credential information from the tag 101A of the key 101. Servers capable of performing this function are well known and commercially available. The network configuration of the server 103 and CAD 102 may be any one of known configurations including, for example, local area networks (LANs), wireless local area networks (WLANs), personal area networks (PANs), campus area networks (CANs), metropolitan area networks (MANs), wide area networks (WANs) (such as the Internet), wireless wide area networks (WWANs), and virtual private networks (VPNs), just to name a few. Such networks may have any suitable architecture, including, for example, client-server, 3-tier architecture, N-tier architecture, distributed objects, loose coupling, or tight coupling. Specifically, the server 103 may communicate with the CAD 102 via the internet 190 or other WAN such as a cable system or telephone. It should be understood that in this configuration, the CAD 102 is a client of server 103. Accordingly, any known client/server architecture and components may be used.

Once the credential information is obtained, the server determines whether the credential information meets the requirements for providing a user access to the content. To this end, the server 103 may access the requirements stored in data store 114. The requirements may include, for example, acceptable key identifications, acceptable time range, acceptable user identification, acceptable locations, acceptable product/feature codes, acceptable billing rate codes, acceptable entitlements/service IDs, acceptable capabilities information, acceptable credential encryption cipher/strength, acceptable designated market area/zip code, acceptable content decoding/rendering capabilities, acceptable bandwidth capability, acceptable conditional access capabilities.

In one embodiment, there may be a minimum number of acceptable keys required to gain access to certain content or to different levels of content. That is, one promotion technique is to require the collection of a multitude of keys and/or a congregation of numerous users having keys in a certain location before certain content is made available. For example, a beer company may require a multitude of keys be accumulated in a bar before the desired content can be displayed in the bar. Likewise, rather than amassing a certain quantity of keys, a promoter may require that a certain combination of keys be presented to a CAD. For example, a promotion may be offered in which different keys corresponding to different products, perhaps over a product line (e.g., different cereals), must be presented to the CAD to acquire access to certain content. Along the same lines, a "scavenger hunt" type promotion may be used encourage users to find/purchase different items for their keys. Still many other promotions are possible by practicing the present invention.

In one embodiment, the server 103 interfaces with a back office system 107 to identify the user and obtain a user profile from data store 113. In one particular embodiment, the user's identity can be determined based upon the credential information of tag 101*a* and/or information based on the location 150. For example, the tag 101*a* may contain not only credential information, but also information on the user that purchased or otherwise acquired key 101. The back office system 107 may also use other correlation techniques to determine the identity of the user such as, for example, associating purchase information of the key 101 with the user using, for example, credit card information. Alternatively, or in conjunction with this approach, the location 150 may provide information on the user. For example, if the CAD 102 is part of a user's STB or otherwise associated with a user's residence, location 150 may be used to determine the identity of the user being associated with the location 150. In yet another embodiment, the server 103 may obtain user identification information directly from the user through a keypad or other data entry means at the location 150. In yet another embodiment, the server 103 may obtain localized authorization data, e.g., via back office system 107, that is relevant for the location 150. In yet another embodiment, the server 103 may obtain localized content delivery parameters that are relevant for the location 150.

The server 103 communicates with the content server 106 through a content server interface 105. The content interface 105 enables the server 103 to communicate back and forth with the content server 106 to ensure that content is delivered properly once the credential information is verified.

The content server 106 functions to deliver content to the user once server 103 verifies that the user is properly credentialed. As with the server 103, content servers are well known and commercially available. The content may be provided from a data store 170 or the content server 106 may interface with other content servers to provide the content. In one embodiment, the content server 106 is integrated with the server 103.

The content server 106 transmits content to the user 104 via a network interface 108. The distribution of content from the content server 106 to the user may be accomplished using any know information networks, including, for example, local area networks (LANs), wireless local area networks (WLANs), personal area networks (PANs), virtual private networks (VPNs), campus area networks (CANs), metropolitan area networks (MANs), wide area networks (WANs) (such as the Internet), and wireless wide area networks (WWANs), just to name a few. Such networks may have any suitable architecture, including, for example, client-server, 3-tier architecture, N-tier architecture, distributed objects, loose coupling, or tight coupling. Preferably, the content is delivered using a broadband network, which includes, for example, cable, fiber optic service, hybrid fibre-coaxial (HFC), and satellite networks.

Additionally, the content may be transmitted to the user using any known media. "Media" refers to the forms in which content may be transmitted. Presently, the most common transmitted media are audio (e.g., music, speech) and visual (photographs, drawings, motion pictures, web pages, animation). These media are typically represented in electronic formats, such as, for example, HTTP, NNTP, UDP, JMS, TCP, MPEG, MP3, wave files, HTML, JPEG, TIFF, and PDF. As transmission technologies become more advanced, however, transmitted media will likely involve other sensory data such as taste, smell and touch.

The network interface 108 is located at location 150 and functions to provide the user 104 with access to the content. The network interface 108 may have different embodiments, including for example a modem or a 10/100/1000 Mbps Ethernet interface. In one embodiment, it comprises a modem 111 to provide content access to a user device 112, such as a personal computer or a personal digital assistant (PDA). Suitable modems include, for example, narrowband/phone-line dialup modems, wireless radio modems (e.g., direct broadcast satellite, Wi-fi and WiMax), mobile modems (e.g., GPRS, UMTS, HSPA, EVDO, etc.), and broadband (cable, doubleway satellite, power line, etc.).

Alternatively, or in conjunction with the modem 111, the network interface 108 may be configured to function with a client 109 such as, for example, a satellite radio or a set top box (STB). The STB may be a discrete unit or its functionality may be embedded in or distributed among other components of the user's system such as the monitor, TV, DVR, or personal computer. For example, the STB may be a portable, modular unit (i.e., a personal STB) or it may be integrated into a stationary TV system.

In one embodiment, the network interface 108 is integrated with the CAD 102 to provide a single unit. Such an approach has the advantage of consolidating the connection with the server side of the system 100. Additionally, such an embodiment ensures that credential acquisition and content delivery occur within the same location 150. In one embodiment, the CAD 102, network interface 108 and client 109 are integrated into a STB.

Although one embodiment of the invention involves distributing the content proximate to the CAD, this is not required. That is, rather than limiting access to the exclusive content while the user proximate to the CAD, it may be beneficial to offer the content to the user at a location different from that of where the CAD is located. For example, once the user presents a key having the proper credentials to a CAD, the content may be made available to the user through his or her STB at a location remote from the CAD. For example, a user may present keys in the form of coupons to a CAD at a store in return for an extra video-on-demand selection on the user's STB.

The client 109, in one embodiment, is connected to a user interface 110, which may be any know device for communicating content to a user, including, for example, a television, a monitor, a loudspeaker, projector, etc. In one particular example, the user interface may be the user's television, or it may be one or more televisions in a public place, such as a bar or restaurant, or it may be a display of a computer connected to the Internet.

The content may be delivered to the user in various ways. For example, the content may be pre-determined and delivered to the user after the proper credentials are provided. Alternatively, the content may be customized and delivered to the user as part of an interactive session with the user, or in response to a user's selection. Still other ways of delivering content will be obvious to one of skill in the art in light of this disclosure.

Figure 2:
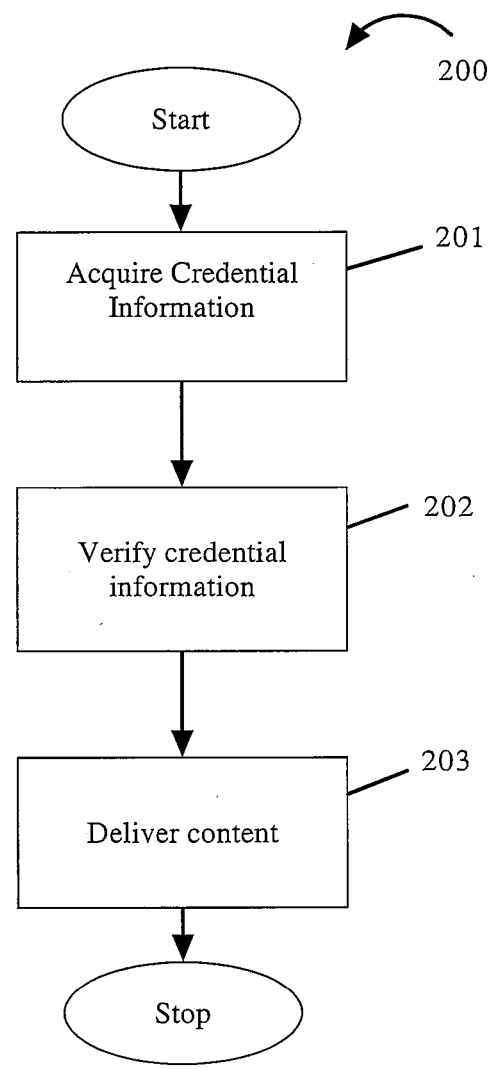
FIG. 2 is a flow chart of a method of the present invention.

System 100 provides a method of providing content at a certain location based upon one or more adequately-credentialed keys related to the content being proximate to the certain location. Referring to FIG. 2, the method 200 of using system 100 is described. In step 201, the credential information is acquired from at least one key 101 in a certain location 150 using a credential-acquisition device (CAD) 150 in the location. Specifically, when the key enters the location 150, the CAD 102 acquires the credential information from the tag 101*a* of key 101 and transmits this information to server 103 to determine the adequacy of the credentials. In step 202, the server 103 determines whether the credential information meets the requirements of delivering the content. To this end, the server 103 may communicate with a back office system 107 to determine user identity and/or profile/preferences. If the credential information meets the requirement for content delivery, the server 103 communicates with the content server 106 to deliver the content to the user. Further, if the identity of the user is known, the server 103 may correlate the content delivered with the user profile obtained from the data store 113. In step 203, the content server 106 provides the content to a network interface 108, which is accessible by the user in different ways. For example, the user may use a client 109 connected to the network interface 108 to access the content, or the user may obtain the content through his PDA or similar user device 112 via the network interface 108. As discussed in the examples below, the method 200 allows access to exclusive content to be used as an incentive to purchase keys.

This method is illustrated further by reference to three examples. In the first example, the key 101 is a sports jersey of a particular team having an RFID tag 101*a* containing credential information, and the CAD 102 is an RFID reader incorporated into a user's STB. In step 201, when the user is wearing the jersey or is otherwise in possession of it near the STB, the CAD in the STB acquires the credential information and transmits it to the server 103. In step 202, the server 103 verifies that the credential information meets requirements for delivering the content to the user. If so, in step 203, the server 103 communicates with the content server 106 through the interface 105 to make the special content available to the user through his or her STB for display on the user's TV. One way to do this is to offer the content as an additional video-on-demand selection on the user's STB. The special content might be, for example, highlights of the team's play or interviews with its members. This example demonstrates how exclusive content of an organization, person, place, or thing, can be used to promote the sale of merchandise related to the organization, person, place or thing.

In the second example, the key 101 is a bottle cap having an RFID tag 101*a* with credential information. The CAD is a RFID reader located in a tavern. In step 201, as patrons purchase and collect bottle caps, the CAD acquires the credential information from the tag of each cap, and transmits it to the server 103. The acquisition of the credential information may occur, for example, at the time the cap is removed from the bottle. More specifically, the act of removing the cap may be used to close a circuit or otherwise activate the cap's RFID tag. Such a mechanism would avoid caps on bottles not yet purchased or opened from being read by the CAD. Alternatively, the users may be required to scan each cap at the CAD once they are removed from the bottle. The credential information may contain an identification of the cap as well as a time stamp. In step 202, the server 103 keeps track of the number of keys whose credentials are transmitted. Once the number of verified credentials having valid time stamps reaches a minimum, exclusive content is made available through the STB of the bar for display on the monitors in the bar in step 203. The exclusive content may be, for example, a soccer or boxing match or other sporting event that is not being broadcast. This example demonstrates how a seller of consumable items can appeal to groups of people to gather, purchase and consume its product in certain locations in return for entertainment at those locations.

In a third example, the key 101 is a ticket to a sporting event. The ticket has an RFID tag 101*a* containing credential information. The CAD is an RFID reader or an array of RFID readers in the arena in which the sport team plays. In step 201, the CAD 102 detects the key as the user enters the arena, acquires its credential information and transmits it to the server 103. The credential information of the ticket may also comprise a time stamp. In step 202, the server 103 determines if the credential information meets the requirements for delivering special content. The server 103 may also rely on a back office system 107 to determine the user's identity by correlating the ticket identification with the purchaser who is presumably the user. This could be done, for example, by correlating a particular ticket to the credit card used to purchase it, and then using credit card to obtain the user's identification. Of course, in such an embodiment, privacy issues must be considered. In step 203, once the credential information is verified as being adequate and having a time stamp within a certain time range, the content is delivered to the user's PDA. Alternatively, the content may be made available through the user's STB for the user to enjoy once he or she returns home. The content may be, for example, replays of the action on the field, looker room reports on the condition of players, or any other exclusive content of interest to a fan present at the arena. This example demonstrates how a sports team can increase appeal to fans to attend games by offering exclusive content of the game while the user is at the game, or after the game to "relive" the experience.

The examples and description above are illustrative of the present invention and should not be used to limit the scope of the claims. Indeed, many other uses and applications of the present invention will be apparent to one of skill of art in light of this disclosure.

What is claimed is:

1. A method, comprising:
    acquiring, via a first device at a certain location, credential information from at least one key tagged with the credential information;
    confirming that the credential information meets a billing rate code requirement and an encryption strength requirement for providing access to content;
    determining whether a time stamp of the credential information is within a predetermined time range;
    identifying a second device at a location that is different from the certain location in response to the acquiring of the credential information; and
    providing access to the content through the second device at the different location after the acquiring, confirming, determining, and identifying.

2. The method of claim 1, further comprising providing access to the content at the certain location.

3. The method of claim 1, wherein the acquiring, via the first device at the certain location, the credential information from the at least one key tagged with the credential information comprises acquiring, via the first device at the certain location, the credential information wirelessly from the at least one key tagged with the credential information.

4. The method of claim 3, wherein the at least one key comprises a radio frequency identification (RFID) tag.

5. The method of claim 1, wherein the acquiring of the credential information comprises acquiring, via the first device at the certain location, at least one of a key identification and user identification.

6. The method of claim 1, wherein the at least one key comprises an article of apparel relating to a sports team and the content relates to the sports team.

7. The method of claim 1, further comprising: offering the content as an incentive to purchase the at least one key.

8. The method of claim 1, wherein the at least one key at least partially contains a consumable item including at least one of a beverage and food.

9. The method of claim 1, further comprising determining whether a predetermined plurality of keys is at the certain location before providing access to the content.

10. The method of claim 1, further comprising determining an identity of a user, wherein the content is correlated with a profile of the user.

11. The method of claim 1, wherein the first device is incorporated into a set top box.

12. The method of claim 1, wherein access to the content is provided automatically to the second device following the acquiring, confirming, and identifying.

13. The method of claim 1, further comprising after providing access to the content at the different location, rendering the content via a user interface at the different location.

14. The method of claim 1, wherein the credential information is acquired from a vendor and the certain location is a location of the vendor, and wherein the different location is a home of a user who received an item including the at least one key.

15. The method of claim 1, wherein the confirming further comprises determining that the encryption strength of the credential information exceeds an encryption strength threshold.

16. The method of claim 1,
wherein the confirming further comprises determining that the different location of the second device is in a designated market area, and
wherein access to the content is provided when the different location of the second device is determined to be in the designated market area.

17. A method, comprising:
acquiring, by a server, credential information received through a wireless interface from a tag storing the credential information, when the tag is at a first location;
determining an identity of a person presenting an item having the tag from payment information used to receive the item, the payment information comprising credit card or debit card information;
verifying that the credential information meets a billing rate code requirement and an encryption strength requirement;
determining a second location based on the determined identity; and
delivering content to the second location, when the credential information meets the billing rate code requirement and the encryption strength requirement.

18. The method of claim 17, further comprising transmitting, by the server to a content server configured to store the content, a verification signal to trigger the delivering of the content.

19. The method of claim 18, further comprising receiving a confirmation signal from the content server to confirm that the delivering of the content was successful.

20. The method of claim 17, further comprising:
presenting additional tags at the first location;
acquiring additional credential information from each of the additional tags; and
verifying that the additional credential information meets additional requirements when a minimum number of total tags are presented at the first location.

21. The method of claim 20, wherein the additional tags comprise RFID tags attached to bottle caps, and
wherein the method further comprises:
changing circuits in the RFID tags when the bottle caps are removed from respective bottles; and
triggering the acquiring of the additional credential information from the RFID tags in response to changing the circuits, the additional credential information including a timestamp.

22. The method of claim 17, further comprising:
presenting additional tags at the first location; and
acquiring additional credential information from each of the additional tags,
verifying that the additional credential information meets additional requirements when a certain variety of different tags associated with a variety of different products are presented at the first location.

23. The method of claim 22, wherein each of the different products comprises a different cereal.

* * * * *